United States Patent [19]

Sakamoto

[11] Patent Number: 5,617,002

[45] Date of Patent: Apr. 1, 1997

[54] METHOD OF AND APPARATUS FOR CHARGING NONAQUEOUS ELECTROLYTIC BATTERY

[75] Inventor: Yoshiaki Sakamoto, Tokyo, Japan

[73] Assignee: Fuji Photo Film Co., Ltd., Kanagawa, Japan

[21] Appl. No.: 333,317

[22] Filed: Nov. 1, 1994

[30] Foreign Application Priority Data

Nov. 2, 1993 [JP] Japan ................................ 5-274595

[51] Int. Cl.⁶ .................. H01M 10/44; H01M 10/46; H01M 10/32; H01M 4/50
[52] U.S. Cl. .................................. 320/2; 320/5; 429/219; 429/224
[58] Field of Search ..................... 320/2, 3, 4, 5, 320/14, 37, 9; 429/218, 224

[56] References Cited

U.S. PATENT DOCUMENTS

| | | | |
|---|---|---|---|
| 4,328,456 | 5/1982 | Suzuki et al. | 320/7 |
| 4,760,564 | 7/1988 | Odagiri | 368/66 |
| 5,231,511 | 7/1993 | Kodama et al. | 358/335 |
| 5,286,582 | 2/1994 | Tahara et al. | 429/218 |
| 5,424,800 | 6/1995 | Suzuki | 354/484 |
| 5,496,664 | 3/1996 | Sterr | 429/224 |

FOREIGN PATENT DOCUMENTS

| | | | |
|---|---|---|---|
| 52-94049 | 8/1977 | Japan | G06F 15/02 |
| 53-78032 | 7/1978 | Japan | H01M 10/44 |
| 61-91883 | 5/1986 | Japan | H01M 10/46 |
| 61-294769 | 12/1986 | Japan | H01M 10/46 |
| 63-91641 | 4/1988 | Japan | G03B 7/26 |

Primary Examiner—Peter S. Wong
Assistant Examiner—Patrick B. Law
Attorney, Agent, or Firm—Sughrue, Mion, Zinn Macpeak & Seas

[57] ABSTRACT

A charging method of and a charging apparatus for charging a nonaqueous electrolytic battery such as a lithium primary battery including a positive pole active material, negative pole active material of a lightweight metal and nonaqueous electrolyte. The charging is carried out at a predetermined electric current per time of 2 μC–5 mC only when the residue capacity of the nonaqueous electrolytic battery is in a range of 5–95%.

15 Claims, 3 Drawing Sheets

METHOD OF AND APPARATUS FOR CHARGING NONAQUEOUS ELECTROLYTIC BATTERY

BACKGROUND OF THE INVENTION

1. Field of the Invention

The present invention relates to a method of charging a nonaqueous electrolytic battery, particularly an electrolyte synthetic manganese black/lithium battery and also relates to a preferable apparatus for carrying out the charging method.

2. Description of the Related Art

As known in the art, a primary battery generally cannot be changed because, for example, an alkali battery may leak its contents or burst and a lithium battery may cause a serious accident such as explosion or fire when being charged. This accident may be caused by poor reversibility of oxidation-reduction of the electrolyte manganese black, which acts as the positive pole active material, and in the case of the lithium battery (or an alloy thereof), there exists dendrite, which causes serious accidents.

Reviewing Japanese Patent Application Laid-open No. 52-94049 disclosing a silver primary battery, it has been taught that a predetermined microelectric power for charging does not cause serious accidents during charging/discharging. The applicant already understands about several materials regarding several combinations of the primary or storage battery and a solar battery, for example, a combination of air/zinc battery and a solar battery (Japanese Patent Application Laid-open No. 53-78032) as lithium storage battery, a combination of activated charcoal/lithium alloy storage battery and a solar battery (Japanese Patent Application Laid-open No. 61-91883), a combination of a chargeable lithium battery and a sonar battery (Japanese Patent Application Laid-open No. 61-294769), and a combination of a lithium battery ($MoS_2$/Li-Al alloy in all embodiment) and a solar battery applied into a camera (Japanese Patent Application Laid-open No. 63-91641).

It is common that in a camera requiring relatively large electric power, for a flash, for example, a lithium battery is used. Recently, there is a tendency to use a solar battery instead of regular battery.

Referring to Japanese Patent Application Laid-open No. 63-91641, the combination of the lithium battery and the solar battery modified to be used in the camera is explained. However, it can not obtain enough electric power from the solar battery which is used in the camera since it is naturally small in size. The lithium storage battery as a chargeable lithium battery is known to leak a lot of electric power which can not Although the lithium primary battery is known as not leaking electric power dendrite may be present which may cause the battery to catch fire when being charged, as mentioned above. Therefore, the lithium battery should be considered a replaceable type of battery.

SUMMARY OF THE INVENTION

Accordingly, it is an object of the present invention to provide a method of charging the nonaqueous electrolytic battery such as the lithium primary battery and an apparatus for preferably carrying out the charging method.

To achieve this object, the present invention provides a method for charging nonaqueous electrolytic battery comprising a positive pole active material, negative pole active material of a lightweight metal and nonaqueous electrolyte, such that the charging is carried out at a predetermined electric current per time of 2 µC–5 mC only when a residue of the positive pole active material is in a range of 5–95% to an entire capacity C of the positive pole active material.

The positive pole active material is recommended to be a manganese black and the negative pole active material is preferably a lithium or a lithium alloy, which is preferable to charge the lithium primary battery.

A preferable apparatus for charging the nonaqueous electrolytic battery by the above-mentioned method is an apparatus for charging a nonaqueous electrolytic battery having a positive pole active material, negative pole active material of a lightweight metal and nonaqueous electrolytes. The apparatus comprises a charging power source; charging means for charging the nonaqueous electrolytic battery by an electric power from the charging power source at a predetermined electric current per time of 2 µC–5 mC; residue monitor means for observing a residue of the positive pole active material in the nonaqueous electrolytic battery; and charging determination means for permitting or prohibiting to charge the nonaqueous electrolytic battery by the charging means upon whether the residue observed by the residue monitor means is in a range of 5–95% to an entire capacity of the positive pole active material.

The charging means may include electric power monitor means for observing electric power stored in the capacitor and electric power transmitting means for transmitting electric power of of a predetermined electric current per time 2 µC–5 mC from the capacitor to the nonaqueous electrolytic battery when the electric power stored in the capacitor reaches at a predetermined level.

Incidentally, the residue monitor means includes a charging amount measuring means for measuring charging degree into the nonaqueous electrolytic battery by counting transmitting time of the electric power from the capacitor to the nonaqueous electrolytic battery by the electric power transmitting means and discharging amount measuring means for measuring discharging degree from the nonaqueous electrolytic battery by counting discharging time from the nonaqueous electrolytic battery to a load at one or respective electric power consumption modes.

In accordance with the present method of charging the nonaqueous electrolytic battery having the negative pole active material of a lightweight metal, the charging is allowed after at least on or more than 5% of the capacity of the positive pole active material "C" is discharged and is regulated to charge until on or less than 95% of the capacity "C" at a charting speed of 2 µC–5 mC to thereby prevent appearance to deadrite.

When the residue of the positive pole active material in the nonaqueous electrolytic battery reaches almost 0%, the charging will become an impossible state. When it reaches 100%, the electrolyte may be decomposed Accordingly, in the present invention the residue is strictly regulated to be in a range from 5% to 95%, so that the preferable charging should be 10–90% of the capacity C. As may be noted, only the positive pole active material is observed in the present invention because a capacity of the negative pole active material of a lightweight metal is large relative to that of the positive pole actlye material.

The appearance of dendrite is influenced by an actual charging speed in view of some examples conducted by the inventors. When charging at an electric current per time of 10 mC, there is almost no dendrite. In case of at an electric current per time of 20 mC, an appearance of dendrite is slightly confirmed. It is therefore determined in the present invention to limit at 5 mC half of 10 mC per time in order to prevent the appearance of dendrite to be thereby secure. A minimum level will not be required to be defined in view of suppressing an appearance of dendrite, however an extremely slow charging can not perform the complete charging, so that the minimum level is set at 5 μC in the present invention. In the same way, the charging speed is at from 10 μC to 1 mC and preferably from 20 μC to 0.5 mC.

The manganese black is recommended as the positive pole active material, and it is more preferable to employ the manganese black electrolyzed or chemically composed. The electrolyte manganese black is obtained by the electrolytic oxidation of an acid solution of manganese sulfate, manganese carbonate, manganese nitric acid, manganese phosphoric acid, manganese acetate, manganese fluoride, manganese chloride, Oxomanganic, or manganese iodide. The most preferable one of them are manganese sulfate or manganese chloride. The thus obtained manganese black should be processed at a temperature of 300°–600° C. and for 1–48 hours. The manganese black chemically composed can be obtained by loading permanganic acid alkali solution into an ebullient solution of neutral manganese sulfate.

The average particle size of the positive pole active material in accordance with the present invention is not limited but preferably from 0.03 to 50 μm. The surface area of the positive pole active material examined by so-called BET method is to be in a range of 1–100 $m^2/g$. The control of particle size and surface area can be executed by means of generally known a pulverizer and a classifying machine, for example mortar, ball mill, vibration ball mill, satellite ball mill, or turning draught jet mill.

An applicable material for the negative pole active material in the present invention is preferably lithium metal or lithium alloy composed with lithium and metal available to be composed with lithium such as Al, Mn, Sn, Mg, Cd and In. Incidentally, the alloy including Al is the best in the present invention.

An agent for laminating electrodes can be used with an additional conductive agent, bonding agent and filler.

The conductive agent should be made from electrically conductive material without any chemical reaction when used. It is recommended to include any one of or mixture of natural black lead (lepdic black lead, squama black lead, soil black lead and so on), artificial black lead, carbon black, acetylene black, keten black, carbon fiber, metallic powder [copper, nickel, aluminum, silver (see, Japanese Patent Application Laid-open No. 63-148554)] and metal textile. Incidentally, it is preferable that the black lead and the acetylene black are taken into one together.

The loads is not regulated particularly but preferably from 1 to 50 wt %, and particularly from 2 to 30 wt %.

The bonding agent is of any one of or a mixture of polysaccharide, thermoplastic resin and elastic polymer, for example starch, polyvinyl alcohol, carboxylate methyl cellulose, hydroxypropyl cellulose, regenerated cellulose, diacetyl cellulose, polyvinyl chloride, polyvinyl pyrrolidone, polytetrafluorethylene, poly-fluoride vinylidene, polyethylene, polypropylene, ethylene-propylene-diene-polymer (EPDM), sulfonation EPDM, sytrene butadiene rubber, polybutadiene, fluoro rubber, polyacrylic acid, or polyethylene oxide. The loads of the bonding agent is not restricted but preferably from 1 to 50 wt % and more preferably from 2 to 30 wt %. The filler should be made of fiber material without any chemical reaction when used. The preferable fiber is of a olefin polymer such as polypropylene and polyethylene, glass or carbon. The loads of filler is not restricted but preferably from 0–30wt %. The nonaqueous electrolyte generally consists of a solution and a lithium acid (anion and lithium cation) contained in the solution. The solution can be any one of or a combination of propylene carbonate, ethylene carbonate, butylene carbonate, dimethyl carbonate, diethyl carbonate, γ-butyrolactone, methyl formate, methyl acetate, 1,2-dimethoxymethane, tetrahydrofuran, 2-methyl tetrahydrofuran, dimethyl sulfoxide, 1,3-dioxolane, formamide, dimethylformamide, dioxolane, acetinitrile, nitremethane, ethylmonoglime, triester phosphoric acid, trimethoxymethane, dioxolane derivative, sulfolane, 3-methyle-2-oxazolidine, porpylene carbonate derivative, tetrahydrofuran derivative, ethyl ether, and nonfloton organic solution such as 1,3-propane. As a cation of lithium chloride to be dissolved in the solution is any one of or a combination of $ClO_4$—, $BF_4$, $PF_6$—, $CF_3SO$—, $CF_3SO_2$—$AsF_6$—, $SbF_5$—, $(CF_3 SO_2) 2N$—, low-rank aliphatic series carboxylate acid ion (Japanese Patent Application Laid-open No. 60-41773), $AlCl_4$—, Cl—, Br—, and I—(Japanese Patent Application Laid-open No. 60-247265). The preferable electrolyte is of a mixing liquid of a propylene carbonate and/or butylene carbonate and a 1,2-dimethoxymethane and/or diethyl carbonate with $LiCF_3SO_3$, $LiClO_4$, $LiBF_4$ and/or $LiPF_5$.

The amounts of the electrolyte in the battery is not restricted but it should be well-balanced in degree in view of the amount of the positive and negative pole active materials and the size of the battery.

The volume ratio of the solvent is not restricted but it is preferable for a mixing solvent of porpylene carbonate and/or butylene carbonate and 1,2-dimethoxymethane to be at a range of from 0.4/0.6–0.6/0.4.

The density of the supporting electrolyte is not restricted but it is recommended to be 0.2–3 mol per 1-liter electrolyte.

The electrolyte can be replaced with a following solid-electrolyte.

There are two types of solid-electrolyte, one being inorganic solid-electrolyte and the other being organic solid-electrolyte. The known inorganic solid-electrolyte are Li nitride, halogenide and oxygen chloride. Taking for some instances, there are $Li_3N$, LiI, $Li_5Ni_2$, $Li_3N$—NiL—LiOH, $LiSiO_4$, $LiSiO_4$—LiI—LiOH (Japanese Patent Application Laid-open No. 49-81899), $xLi_3PO_4$—$(1-x)Li_4SiO_4$ (Japanese Patent Application Laid-open No. 59-60866), $Li_2SiS_3$ (Japanese Patent Application Laid-open No. 60-501731), and zinc phosphorus compound (Japanese Patent Application Laid-open No. 62-82665).

The organic solid-electrolyte can be processed from a polymer containing polyethyleneoxide derivative or the derivative (Japanese Patent Application Laid-open No. 63-135447), a polymer containing polypropyleneoxide derivative or the derivative, a polymer containing ionic dissociative base (Japanese Patent Application Laid-open No. 62-254302, 62-254303 and 63-193954), a mixture of a polymer containing ionic dissociative base and the nonproton electrolyte (U.S. Pat. No. 4,792,504, 4,830,939 and Japanese Patent Application Laid-open No. 62-22375, 62-22376, 63-22375, 63-22776, and No. 1-95117), a phosphate ester polymer (Japanese Patent Application Laid-open No. 61-256573), and a matrix material molecule including nonfloton polar solvent (U.S. Pat. No. 4,822,70, 4,830,939, Japanese Patent Application Laid-open No. 63-239779, Japanese Patent Application No. 2-30318 and 2-78531). The electrolyte can be used with polyacrylonitrile (Japanese Patent Application Laid-open No. 62-278774). The nonorganic and the organic solid-electrolyte can be taken together (Japanese Patent Application Laid-open No. 60-1768).

The separator is provide as an electrical insulating membrane having an excellent permeability and a predetermined mechanical strength. In view of antiorganic solvent properties and hydrophobic property, a sheet or nonwoven fabric made of olefin polymer such as polypropylene and polyethylene or glass fiber. The bore of the separator is determined in view of that for a general battery, for example from 0.1 to 10 μm. The thickness of the separator is also determined in view of that for a general battery, for example from 5 to 300 μm.

The current collector of the electrode active material can be of an electronic conduction which does not cause any chemical reaction in the battery. Taking for an instance, the positive pole, it is recommended to use stainless steel, nickel, aluminum, titanium or burning carbon, otherwise aluminum or stainless steel finished with carbon, nickel, titanium or silver and, for the negative pole, it is recommended to use stainless steel, nickel, copper, titanium, aluminum or burning carbon, otherwise copper or stainless steel finished with carbon, nickel, titanium or silver. If necessary, it will be also available to oxidize the surface of these materials. The shape can be in a foil, film, sheet, net or punched out state otherwise lath, porous, foaming or fibrous substances. The positive pole is preferable to be made from titanium or stainless steel in a net or punched out state. The thickness of the positive pole is not restricted but it is recommended to be in a range of 1–50 μm.

In the apparatus for charging nonaqueous electrolytic battery according to the present invention, there is provided a photoelectromotive element by which the electric power is generated and is charged into the nonaqueous electrolytic battery, in which the residue of the positive pole active material of the nonaqueous electrolytic battery is monitored as when the residue is at 5–95%, the charging at an electronic curent per time of 2 μC–5 mC is carried out and when the residue is at less than 5% or more than 95%, the charging is prohibited to thereby prevent the appearance of dendrite.

To monitor the residue of the nonaqueous electrolytic battery requires to observe discharging amount from the nonaqueous electrolytic battery and charging amount to the nonaqueous electrolytic battery. The monitoring of discharging and charging electrical power are not particular one for the present invention, but the following process for monitoring will be appreciated.

The monitor of discharging can be carried out by means of an ampere meter or an ampere-hour meter observing the discharging current directly if the discharging current is large. Regarding to the monitor of discharging amount, there are some other methods such as direct monitoring, for example when once discharging amount is almost determined in one or plural electric power consumption mode respectively, for example 2 joule per one shot when recording without a flash and 15 joule per one shot when recording with a flash, the discharging amount can be monitored by counting discharging time every electric power consumption mode. If the consumed electric power per time is preliminary confirmed as that in a radio, the discharging amount can be monitored by measuring the discharging period.

Referring to monitor the charging amount, since the electric power generated by the photoelectromotive element is too small to monitor it directly because the monitoring requires rather large electric power. Accordingly, the electric power generated by the photoelectromotive element is stored in the electric power store means such as the capacitor and the electric power and the predetermined level of the electric power is transmitted to the nonaqueous electrolytic battery by the charging means. The transmitting time is counted to transmit the electric power into the battery by the charging means, so that the charged amount can be monitored by counting the transmitting time.

BRIEF DESCRIPTION OF THE DRAWINGS

The exact nature of this invention, as well as other objects and advantages thereof, will be readily apparent from consideration of the following specification relating to the accompany drawings, in which like reference characters designate the same or similar parts throughout the figures thereof and wherein.

DETAILED DESCRIPTION OF THE PREFERRED EMBODIMENT(S)

Detailed description will hereunder be given of the preferred embodiment of a charging method of and a charging device for a nonaqueous electrolytic battery according to the present invention with reference to the accompanying drawings.

Figure 1:
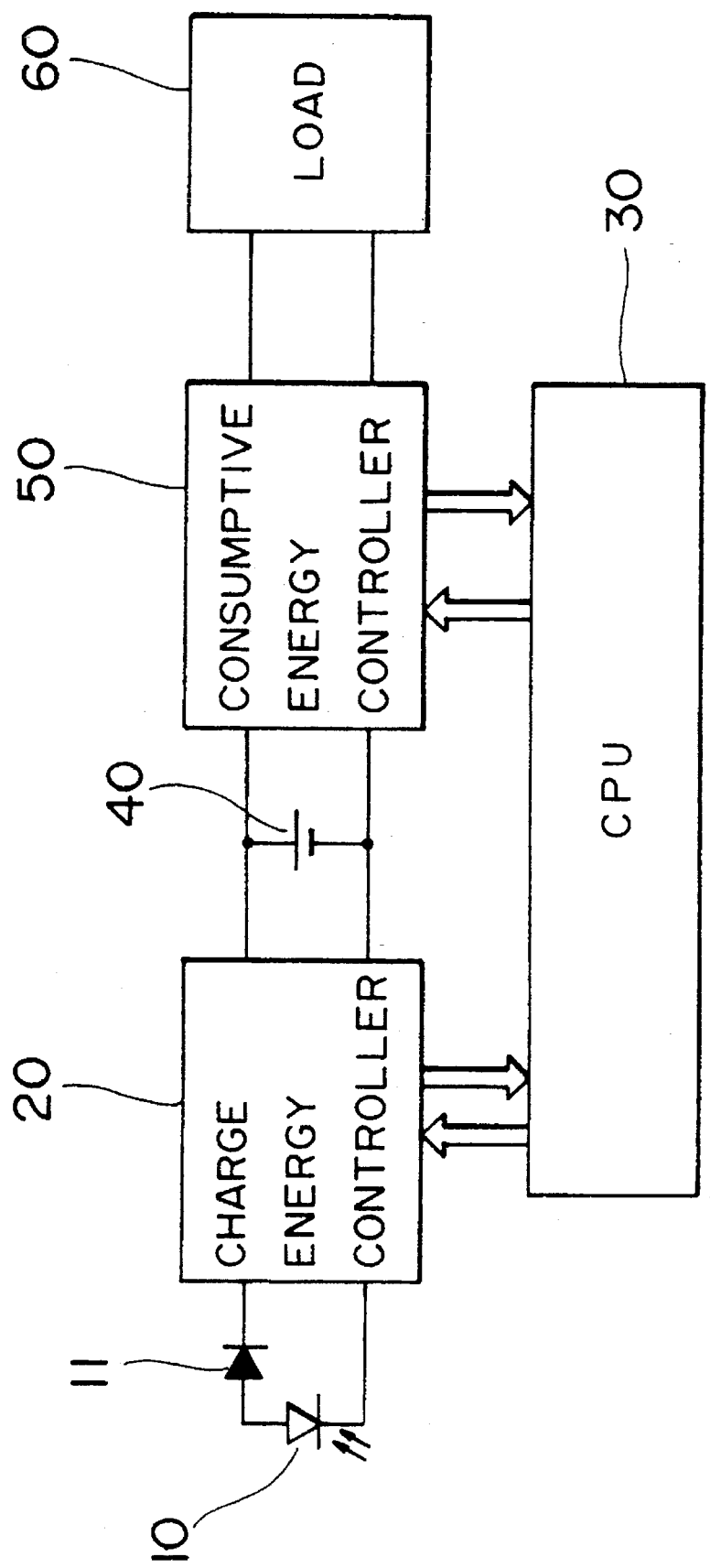
FIG. 1 is a block diagram of preferable embodiment of the present invention.

FIG. 1 is a block diagram explaining a preferable embodiment of a charging device in accordance with the present invention. The followings explanation will refer to a charging device built in a camera as an example in the present application.

As known well, when a solar battery 10 is exposed to light, a faint current can be generated therein. The introduced solar battery 10 has its dimensions of 45×25 mm$^2$ to generate a certain electric current, for example in a cloudy day of 1500 luxes it will generate 50 μA, and in a fine summer day of 50,000 luxes, it will generate 1.7 mA. The generated electric current is sent to a charge energy controller 20 to be stored therein through a diode 11.

The stored electric power in the charge energy controller 20 is monitored by a CPU (Central Processing Unit) 30. The CPU 30 monitors the number of transmission time of electric power from the charge energy controller 20 to a lithium primary battery 40 and also monitors electric power to a Consumption energy controller 50. The lithium battery 40 is a nonaqueous electrolytic battery comprising a positive pole active material of a lightweight material and nonaqueous electrolyte, such as maganese black, and a negative pole active material, such as lithium or a lithium alloy. When a certain amount of electric power is stored in the charge energy controller 20 and the CPU 30 confirms that the power level of the lithium primary battery 40 is at 5–95%, which also indicates that the residue of the positive pole active material is in a range of 5–95% of the entire capacity of the positive pole active material, the lithium primary battery 40 is recharged with the charge energy controller 20. Hence, the CPU 30 acts as an apparatus for monitoring the residue of the positive pole active material in the nonaqueous electrolyte battery (i.e., "residue monitoring means"). Incidentally, the recharging of the lithium primary battery 40 is carried out at less than 5 mC, the unit C being of a capacity of a positive pole active material of the lithium primary battery 40.

The electric power originally stored in the lithium primary battery 40 and recharged in the same is sent to a lead 60 through the consumptive energy controller 50. The lead 60 consists of a shutter circuit, autofocus circuit, a strobe (flash) circuit and so on in the camera. When taking a picture without a flash, 2 joule per shot Will be consumed in the lead 8 and when taking a picture with a flash, 14 joule per shot will be needed. Accordingly, the CPU 30 always monitors the application of a flash and the shot times to measure discharged electric power from the lithium primary battery 40. As has been mentioned before that the CPU 30 also monitors transmitting times of electric power from the charge energy controller 20 to the lithium primary battery 40 to measure electric power to the lithium primary battery 40 because of a constant level of the transmitted electric power per one recharging. The primarily stored electric energy (electric capacity C) in the lithium primary battery 40 is already known, so that the power level of the lithium primary battery 40 can be examined by the CPU 30.

Figure 2:
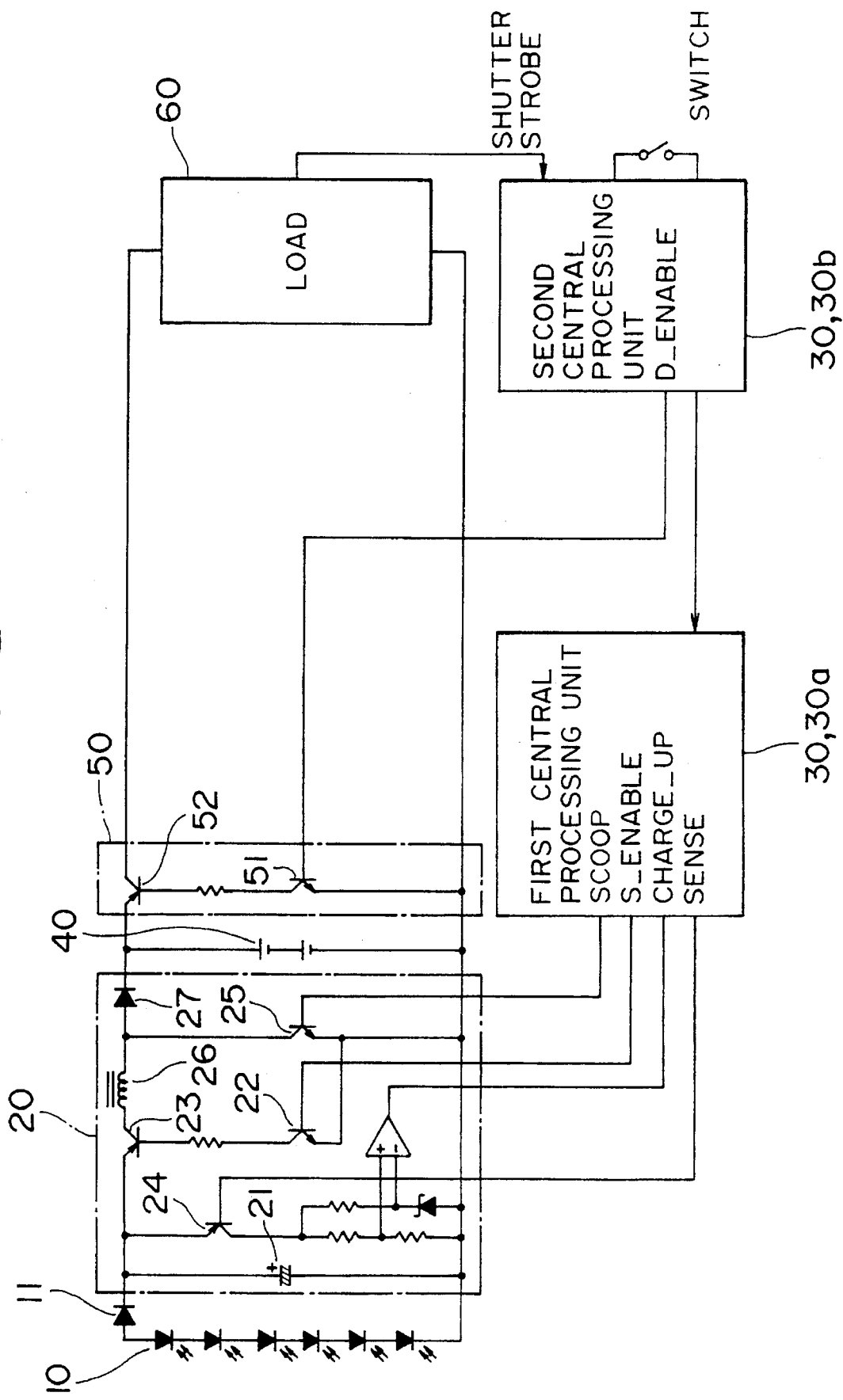
FIG. 2 is a detailed schematic of the embodiment in FIG. 1.
Figure 3:
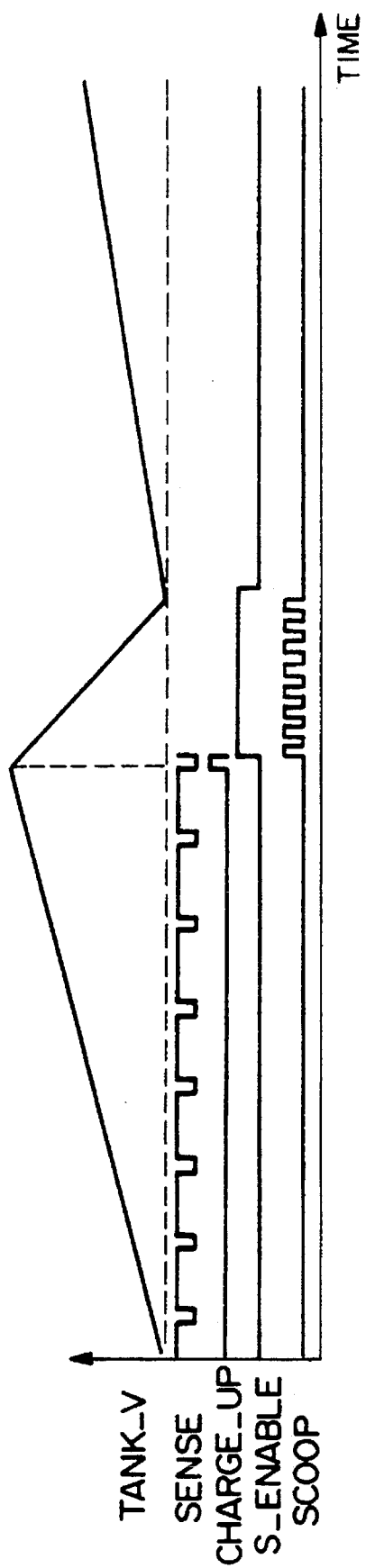
FIG. 3 is a timing chart of the schematic shown in FIG. 2.

Now referring to FIG. 2, it is a detailed schematic of the embodiment shown in FIG. 1. FIG. 3 is a timing chart of FIG. 2. The details of the preferred embodiment will hereunder be explained with reference to the drawings.

The charge energy controller 20 is provided with a capacitor 21 to store therein the electric power generated by the solar battery 10 through the diodo 11. In this state, a S_ENABLE signal reaches a L-level and both a NPN transistor 22 and PNP transistor 23 are in an OFF-state. Even if a terminal voltage of the capacitor 21 exceeds that of the lithium primary battery 40 resulted from the electric power generated in the solar battery 1 and stored in the capacitor 21, a free transmitting of electric power from the capacitor 21 to the lithium primary battery 40 will be fairly prevented.

A SENSE signal is normally kept in an OPEN COLLECTOR state, so that, for example, L-level is shown once an hour, at which the power is turned on via a PNP transistor 24. As shown in FIG. 3, a terminal voltage TANK_V of the capacitor 21 is monitored and when a certain level of the terminal voltage TANK_V of the capacitor 21 will be confirmed as a result, a CHARGE_UP signal reaches H-level. The electric power generated in the solar battery 10 is too faint to monitor the terminal voltage of the capacitor 21 constantly because of the large consumption of electric power for monitoring. It is therefor practical to turn the power on periodically when monitoring to save the valuable electric power obtained by the solar battery 10.

The first central processing unit 30a receives information regarding a change of the CHARGE_UP signal to H-level and when the first central processing unit 30a confirms the power level of lithium primary battery 40 at 5–95%, the S_ENABLE signal is made into H-level to shift the PNP transistor 23 into ON-state. It should be also understood that a SCOOP signal of pulse is output from the first central processing unit 30a to a base of the NPN transistor 25 as shown in FIG. 3 to quickly switch the NPN transistor 25 into ON or OFF-state. When the NPN transistor 25 is in ON-state, the electric power stored in the capacitor 21 is shifted into the coil 26 and when the NPN transistor 25 changed into OFF-state, the electric power stored in the coil 26 will be stored in the lithium primary battery 40 through the diode 27.

The above-mentioned process is adapted to be repeated, so that the electric power of the capacitor 21 is transmitted into the lithium primary battery 40 to thereby change S_ENABLE signal at L-level after a predetermined intervals, whereby the electric path between the capacitor 21 and the lithium primary battery 40 and the SCOOP signal will also be ended. The transmitted electric power p1 can be obtained by the following theoretical equation (1), in which "V" represents the terminal voltage of the capacitor 21 before the electric power transmission and "$C_0$" represents capacity of the capacitor 21.

$$P_1 = (\tfrac{1}{2}) * C_0 V^2 \tag{1}$$

Incidentally, the electric power transmission should be carried out with a restrained electric current on or less than 5 mC by controlling the ON/OFF pulse width of the NPN transistor 25.

Upon such transmission of electric power, a counter (not-shown) included in the first central processing unit 30a to count the electric power transmission times will be counted up. According to the counted number, it will be understood that how much amount of electric power from the capacitor 21 to the lithium primary battery 40 has been transmitted by the following equation (2), in which "n" represents the counted number of the counter and "$P_1$" represents the whole transmitted electric power from the capacitor 21 to the lithium primary battery 40.

$$P_1 = p_1 * n = (\tfrac{1}{2}) * C_0 V^2 * n \tag{2}$$

By the way, when a cap covering a lens face of the camera is taken out, a SWITCH signal reaches H-level. The second central processing unit 30b being of the CPU 30 receives an information of the H-level of SWITCH signal to change a D_ENABLE signal from L-level to H-level. The NPN transistor 51 of the consumptive energy controller 50 accordingly shifts into ON-state and the PNP transistor 52 also changes into the ON-state to electrically connect the lithium primary battery 40 with the load 60. From the load 60, a shutter signal meaning of recording with an open-and-close motion of shutter and a STROBE signal whether the strobe has used when recording are inputted into the second central processing unit 30b. The second central processing unit 30b recognizes the consumed electric power in the load 60 upon receiving those signals and sends the results thereof to the first central processing unit 30a. The first central processing unit 30a can confirm the power level of the lithium primary battery 40 based on the charged amount to the lithium primary battery 40 recognized by itself, the electric power sent from the second central processing unit 30b and consumed in the load 60, the discharged amount from the lithium primary battery 40 and the capacity C of the presetted lithium primary battery 40.

Accordingly, it can be anticipated how may recording shots will be available without charging. If necessary, the anticipated information can be shown on an optional liquid-crystal display. For the user of such a camera with the display, the charging necessity by means of the solar battery will be forcasted considering a future shot number.

However, although the terminal voltage TANK_V of the capacitor 21 reaches to the certain level and when the power level of the lithium primary battery 40 is on or less than 5% or on or more than 95%, the S_ENABLE signal is maintained at L-level. The SENSE signal is maintained at L-level, so that the stored electric power in the capacitor 21 will be discharged through the PNP transistor 24 in order to maintain the terminal voltage TANK_V of the capacitor 21 at the predetermined voltage.

It is recommended that if charging is impossible due to the low power level of the lithium primary battery 50 or less than 5%, a LED would be turned on or flickered, the optional liquid-crystal display would show such state or a buzzer sounds until the power level of the lithium primary battery 40 reaches 0 (zero) % in order to notify the impossible state of charging.

In order to confirm the effect of the present invention, there will be explained hereunder an example for testing a charging speed to the lithium primary battery 40 by changing the solar battery 10 to another one having larger surface area, also changing the capacitor 21 to another one having different capacity and further changing the duty ratio regarding ON/OFF of the NPN transistor 22 in the circuit described in FIG. 2. The lithium primary battery 40 is successively replaced and an extraction of and a degree of dendrite regarding to the lithium primary battery after charging are examined by means of microscope.

As a result, when the power level of the lithium primary battery 40 is kept in a range of 5–95% and the charging until 95% is carried out at a charging speed of on or less than 10 mC, the presence of dendrite can not be confirmed. But when 5 samples are carried out at 20 mC and discharged until each power level thereof reaches 5%, only one of them does not show dendrite narrowly. When charging the lithium primary battery completely discharged to almost reach 0 (zero) %, a preferable charging could not be done. Regarding to the lithium primary battery showing the full power level of 100%, completely discharged or not used, when charging the same, the lithium ion in the electrolyte will be extracted first, which naturally would result into a decomposition of the electrolyte when there will be no lithium ion in the electrolyte, so that no further charging of the lithium primary battery was carried out.

As has been explained above, the nonaqueous electrolytic battery such as the lithium primary battery will be charged safely.

It should be understood, however, that there is not an intention to limit the invention to the specific forms disclosed, but on the contrary, the invention is to cover all modifications, alternate constructions and equivalents falling within the spirit and scope of the invention as expressed in the appended claims.

I claim:

1. A method of charging a nonaqueous electrolytic battery comprising positive pole active material composed of manganese dioxide, negative pole active material composed of one of lithium and a lithium alloy, and nonaqueous electrolyte, wherein the charging is carried out at a predetermined electric current per time of 2 µC–5 mC only when a residue of the positive pole active material is in a range of 5–95% to an entire capacity C of the positive pole active material.

2. A method of charging a nonaqueous electrolytic battery according to claim 1, wherein an average particle size of the positive pole active material is in a range of 0.03–50 µm.

3. A method of charging a nonaqueous electrolytic battery according to claim 1, wherein a surface area of the positive pole active material is in a range of 1–100 m²/g.

4. A method of charging a nonaqueous electrolytic battery according to claim 2, wherein the manganese black is one of electrolyzed and chemically composed, and heated at a temperature of 300°–60° C. for 1–48 hours.

5. A method of charging a nonaqueous electrolytic battery according to claim 2, wherein the lithium alloy is provided to include aluminum.

6. An apparatus for charging a nonaqueous electrolytic battery having a positive pole active material, negative pole actlye material of a metal and nonaqueous electrolyte, said apparatus comprising:

a charging power source;

charging means for charging said nonaqueous electrolytic battery by electric power from said charging power source at a predetermined electric current per time of 2 µC–5 mC;

residue monitor means for observing a residue of the positive pole active material in said nonaqueous electrolytic battery; and charging determination means for permitting or prohibiting to charge said nonaqueous electrolytic battery by said charging means upon whether the residue observed by said residue monitor means is in a range of 5–95% to an entire capacity of the positive pole actlye material.

7. An apparatus for charging a nonaqueous electrolytic battery according to claim 6, wherein said charging power source consists of a solar battery converting light energy to electric energy and a capacitor storing the electric power generated by the solar battery.

8. An apparatus for charging a nonaqueous electrolytic battery according to claim 7, wherein said charging means includes electric power monitor means for observing electric power stored in the capacitor and electric power transmitting means for transmitting electric power at said predetermined electric current per time of 2 µC–5 mC from the capacitor to said nonaqueous electrolytic battery when the electric charge stored in the capacitor reaches at a predetermined level.

9. An apparatus for charging a nonaqueous electrolytic battery according to claim 8, wherein the residue monitor means includes charging amount measuring means for measuring charging degree into said nonaqueous electrolytic battery by counting transmitting time of the electric power from the capacitor to said nonaqueous electrolytic battery by the electric power transmitting means and discharging amount measuring means for measuring discharging degree from said nonaqueous electrolytic battery by counting discharging time from said nonaqueous electrolytic battery to a load at one of respective electric power consumption modes.

10. An apparatus for charging a nonaqueous electrolytic battery according to claim 9, wherein the load is an electric power consuming section of a camera.

11. An apparatus for charging a nonaqueous electrolytic battery according to claim 8, wherein the residue monitor means includes charging amount measuring means for measuring charging degree into said nonaqueous electrolytic battery based on a counting number of electrical power transmission from the capacitor to said nonaqueous electrolytic battery by the electric power transmitting means and discharging amount measuring means for measuring discharging degree from said nonaqueous electrolytic battery by confirming discharging time from the nonaqueous electrolytic battery to a load which consumes certain electric power per time.

12. A method of charging a nonaqueous electrolytic battery comprising a positive pole active material composed of manganese dioxide and negative pole active material composed of one of a lithium and a lithium alloy, wherein the residue of said lithium manganese battery is detected, and said lithium manganese battery is charged at such a predetermined micro-electric current that a dendrite does not grow at a negative pole when the detected residue of said lithium manganese battery is in a predetermined range between a predetermined lowest level in which said manganese dioxide does not deteriorate due to over-discharging and a predetermined highest level in which liberated lithium ion decreases due to overcharging and said nonaqueous electrolyte does not deteriorate.

13. An apparatus for charging a nonaqueous electrolytic battery connected to a camera which consumes electricity at every photographing, comprising:

a solar battery for converting light energy into electric energy;

a condenser for storing the electric energy obtained by said solar battery;

electric power transmitting means for transmitting the electric energy stored in said condenser to said nonaqueous electrolytic battery; and control means detecting a quantity of the electric energy stored in said condenser to activate said electric power transmitting means every time said quantity reaches a predetermined level, and then stopping said electric power transmitting means, whereby charging said nonaqueous electrolytic battery intermittently.

14. The apparatus for charging the nonaqueous electrolytic battery according to claim 13, wherein said control means has residue monitor means for activating said electric power transmitting means when the residue of said nonaqueous electrolytic battery is in a predetermined range in which overcharging and over-discharging do not occur.

15. The apparatus for charging the nonaqueous electrolytic battery according to claim 14, wherein warning means is provided, and said control means makes said warning means give warning when the overcharging is detected by said residue monitor means.

* * * * *